United States Patent
Hongo et al.

(10) Patent No.: US 11,532,926 B2
(45) Date of Patent: Dec. 20, 2022

(54) ROUTING STRUCTURE OF SHIELDED ELECTRIC WIRE

(71) Applicant: YAZAKI CORPORATION, Tokyo (JP)

(72) Inventors: Satoko Hongo, Susono (JP); Hiroki Kondo, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/527,385

(22) Filed: Nov. 16, 2021

(65) Prior Publication Data
US 2022/0200253 A1    Jun. 23, 2022

(30) Foreign Application Priority Data
Dec. 18, 2020 (JP) .............................. JP2020-210004

(51) Int. Cl.
*H02G 3/04* (2006.01)

(52) U.S. Cl.
CPC ................................ *H02G 3/0481* (2013.01)

(58) Field of Classification Search
CPC .................................................. H02G 3/0481
USPC ......................................................... 174/68.3
See application file for complete search history.

(56) References Cited

U.S. PATENT DOCUMENTS

| 6,417,445 B1 | 7/2002 | Sato et al. |
| 2013/0341060 A1* | 12/2013 | Kozawa ................. H01B 7/202 |
| | | 174/68.3 |
| 2015/0083458 A1* | 3/2015 | Tanaka ..................... H01B 7/04 |
| | | 174/107 |
| 2015/0170790 A1 | 6/2015 | Guthrie |
| 2015/0237770 A1* | 8/2015 | Yamasaki ............ H02G 3/0412 |
| | | 174/68.3 |
| 2018/0065216 A1 | 3/2018 | Duquette et al. |
| 2019/0164667 A1* | 5/2019 | Huang ............... H01B 11/1033 |

FOREIGN PATENT DOCUMENTS

| DE | 60016319 T2 | 12/2005 |
| JP | 2012-80635 A | 4/2012 |
| JP | 2020-35677 A | 3/2020 |

* cited by examiner

*Primary Examiner* — Timothy J Thompson
*Assistant Examiner* — Michael F McAllister
(74) *Attorney, Agent, or Firm* — Sughrue Mion, PLLC

(57) ABSTRACT

A routing structure of a shielded electric wire, the shielded electric wire including an electric wire and a resin tube is routed in a state of being bent, the resin tube including a shield layer, an inner-side resin and an outer-side resin, the shield layer being interposed between the inner-side resin and the outer-side resin, is provided. A tensile strength of the inner-side resin and the outer-side resin is greater than a bending stress to be generated when the shielded electric wire is bent with a minimum bend radius in the routing structure. The shield layer has a shield resistance equal to or smaller than 103.8 mΩ/m and a shield density equal to or greater than 50%, the shield density being a ratio of an area of a surface of the electric wire covered by the shield layer to an area of the surface of the electric wire.

2 Claims, 5 Drawing Sheets

ROUTING STRUCTURE OF SHIELDED ELECTRIC WIRE

CROSS-REFERENCE TO RELATED APPLICATION

The present application claims priority to Japanese Patent Application No. 2020-210004 filed on Dec. 18, 2020, the entire content of which is incorporated herein by reference.

TECHNICAL FIELD

The present invention relates to a routing structure of a shielded electric wire.

BACKGROUND

In a related art shielded electric wire, a rod-shaped conductor is coated with an insulating coating tube including a shielding braid (for example, see JP2020-35677A). In this shielded electric wire, the insulating coating tube has an inner layer and an outer layer, and a shield layer is interposed between the inner layer and the outer layer.

However, the shielded electric wire of the related art is not made to be used in a portion where the shielded electric wire has to be bent, and there is a possibility that desired heat dissipation performance cannot be secured at the bent portion. In addition, there is a possibility that sufficient shielding performance cannot be obtained due to a design of the shield layer.

SUMMARY

Illustrative aspects of the present invention provide a routing structure of a shielded electric wire configured to suppress a decrease in heat dissipation performance and securing shielding performance.

According to an illustrative aspect of the present invention, a routing structure of a shielded electric wire, the shielded electric wire including an electric wire and a resin tube covering the electric wire is routed in a state of being bent, the resin tube including a shield layer, an inner-side resin and an outer-side resin, the shield layer being interposed between the inner-side resin and the outer-side resin, is provided. The resin tube is configured such that, a tensile strength of the inner-side resin and the outer-side resin is greater than a bending stress to be generated when the shielded electric wire is bent with a minimum bend radius in the routing structure. The shield layer has a shield resistance equal to or smaller than 103.8 mΩ/m and a shield density equal to or greater than 50%, the shield density being a ratio of an area of a surface of the electric wire covered by the shield layer to an area of an entirety of the surface of the electric wire.

Other aspects and advantages of the invention will be apparent from the following description, the drawings and the claims.

DESCRIPTION OF EMBODIMENTS

Hereinafter, the present invention will be described in accordance with a preferred embodiment. The present invention is not limited to the embodiment to be described below, and can be changed as appropriate without departing from the gist of the present invention. In addition, although some configurations are not shown or described in the embodiment to be described below, it goes without saying that a known or well-known technique is applied as appropriate to details of an omitted technique within a range in which no contradiction occurs to contents to be described below.

Figure 1:
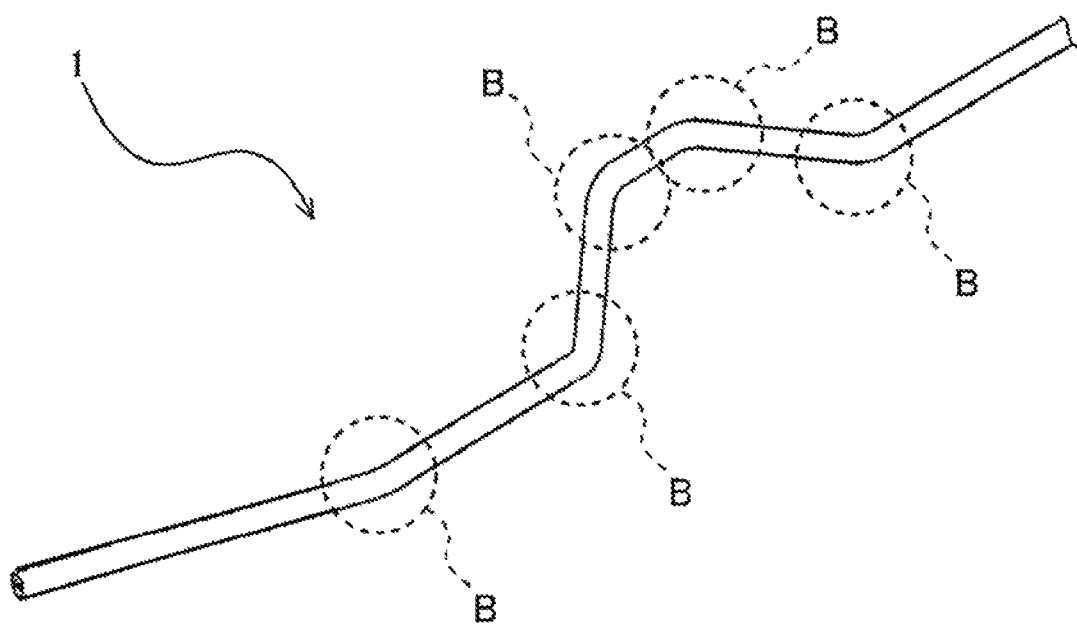
FIG. 1 is a perspective view showing an example of a routing structure of a shielded electric wire according to an embodiment of the present invention.

FIG. 1 is a perspective view showing an example of a routing structure of a shielded electric wire according to an embodiment of the present invention. As shown in FIG. 1, a shielded electric wire 1 is routed in a state of being bent at a plurality of bends B (the number of the bend B may be one) in accordance with a vehicle shape, for example, in a vehicle. With the following configuration, the shielded electric wire 1 secures both shielding performance and heat dissipation performance at the bend B.

In FIG. 1, the shielded electric wire 1 is routed in an exposed state, but the configuration is not particularly limited thereto, and the shielded electric wire 1 may be routed in a state where a protective tube such as a corrugated tube is provided. Further, the shielded electric wire 1 may be routed together with other electric wires by tape winding or the like.

Figure 2A:
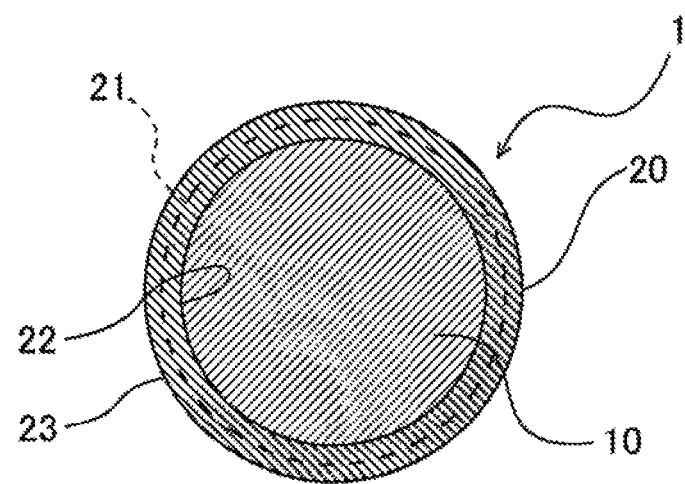
FIG. 2A is a detailed configuration diagram of the shielded electric wire shown in FIG. 1, and shows a cross-sectional view thereof.
Figure 2B:
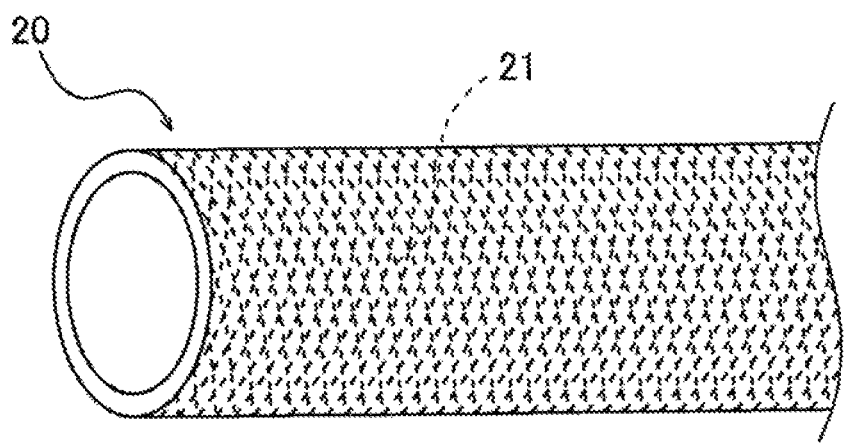
FIG. 2B is a detailed configuration diagram of the shielded electric wire shown in FIG. 1, and shows a partial configuration thereof.

FIG. 2A is a detailed configuration diagram of the shielded electric wire shown in FIG. 1, and shows a cross-sectional view thereof. FIG. 2B is a detailed configuration diagram of the shielded electric wire shown in FIG. 1, and shows a partial configuration thereof. As shown in FIG. 2A, the shielded electric wire 1 includes an electric wire 10 and a resin tube 20.

The electric wire 10 is a rod-shaped conductor, that is, a bare electric wire. The electric wire 10 is made of, for example, copper, aluminum, or an alloy thereof. Although the electric wire 10 is a bare electric wire in the example shown in FIG. 2A, the electric wire 10 is not particularly limited thereto, and may be a coated electric wire having an insulating coating.

As shown in FIGS. 2A and 2B, the resin tube 20 is a tubular member made of an insulating resin, and includes a shield layer 21 having a shielding function. Specifically, the resin tube 20 includes an inner-side resin 22 serving as a tube inner side, an outer-side resin 23 serving as a tube outer side, and the shield layer 21 interposed between the inner-side resin 22 and the outer-side resin 23.

The shield layer 21 may be a braid made of a metal wire or may be a metal foil. Examples of the metal of the shield layer 21 include copper, aluminum, iron, stainless steel, and alloys thereof. In order to improve durability, a plated fiber conductor in which a high-strength fiber is plated with a metal may be used as a material of the shield layer 21. Here, the high-strength fiber is a fiber material chemically synthesized from a raw material such as petroleum, and has a tensile strength at breakage being equal to or greater than 1 GPa and an elongation percentage at breakage of 1% or more and 10% or less. Examples of such a fiber include an aramid fiber, a polyarylate fiber, and a PBO fiber. The high-strength fiber is plated with copper, nickel, tin, gold, silver, an alloy thereof, or the like.

Here, in the present embodiment, the shield layer 21 has a shield resistance of 103.8 mΩ/m or less, and a shield density thereof, which is a ratio of an area of a surface of the electric wire 10 covered by the shield layer 21 to an area of an entirety of the surface of the electric wire 10, is 50% or more.

Figure 3:
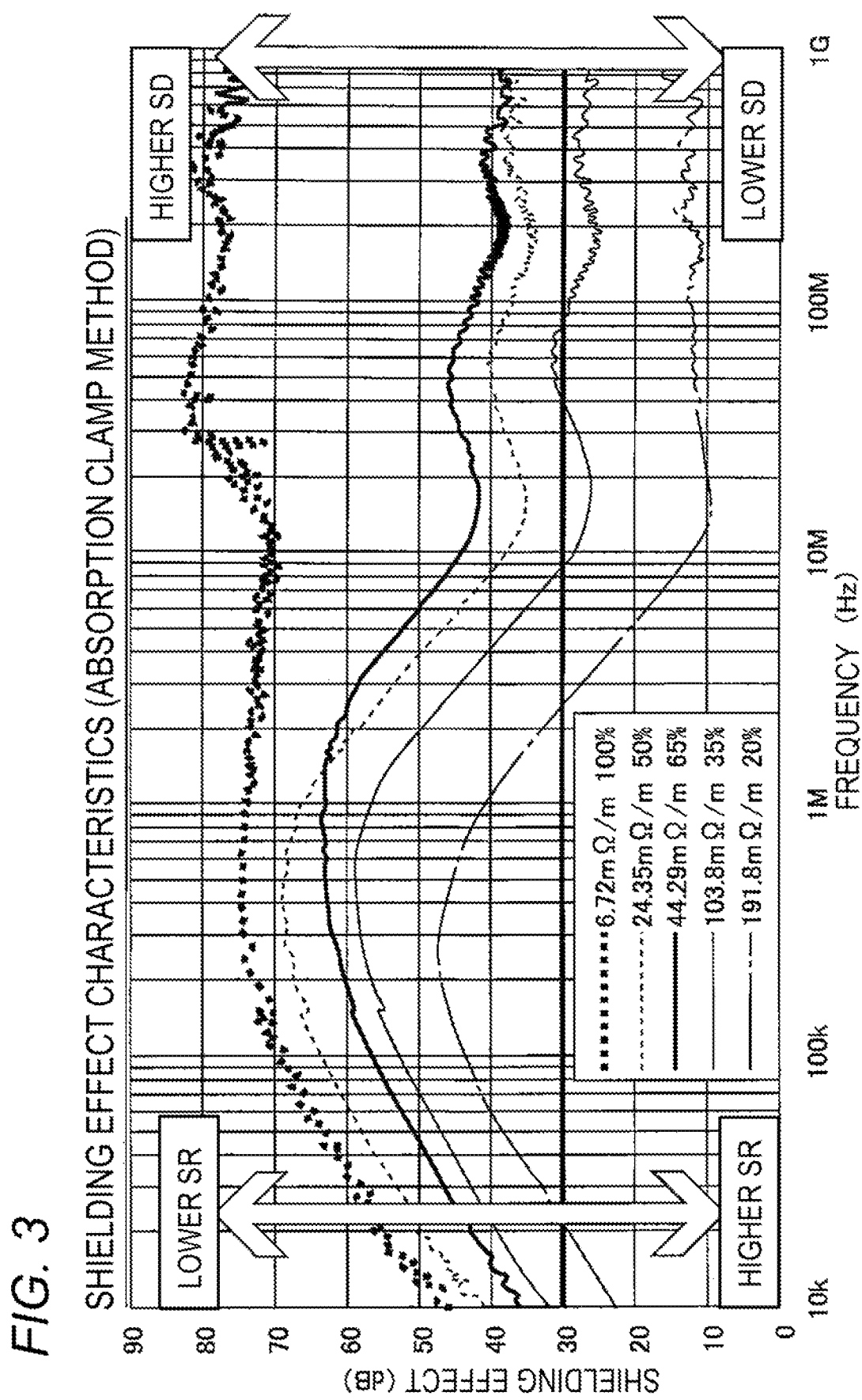
FIG. 3 is a graph showing a shielding effect for each frequency according to a shield resistance and a shield density.

FIG. 3 is a graph showing a shielding effect for each frequency according to the shield resistance (SR in FIG. 3) and the shield density (SD in FIG. 3). The shielding effect shown in FIG. 3 is a result obtained by measurement using an absorption clamp method. In general, when the shielding effect is 30 dB or more, it is said that there is a noise cut effect to such an extent that a mobile phone is out of range. Also in the shielded electric wire 1 according to the present embodiment, the shielding effect of 30 dB is secured.

Here, as shown in FIG. 3, in a low frequency region (a region of 1 MHz or less), the shielding effect tends to improve as the shield resistance decreases. Therefore, in order to secure the shielding effect of 30 dB in the entire range of 10 kHz or more and 1 MHz or less, the shield resistance needs to be 103.8 mΩ/m or less.

On the other hand, in a high frequency region (a region exceeding 1 MHz), the shielding effect tends to improve as the shield density increases. Therefore, in order to secure the shielding effect of 30 dB in an entire region of 1 MHz or more and 1 GHz or less, the shield density needs to be 50% or more.

As described above, in the present embodiment, when the shield resistance of the shield layer 21 is set to be equal to or smaller than 103.8 mΩ/m and the shield density is set to be equal to or greater than 50%, the shielding effect equal to or greater than 30 dB can be secured in the entire region of 10 kHz or more and 1 GHz or less.

Figure 4:
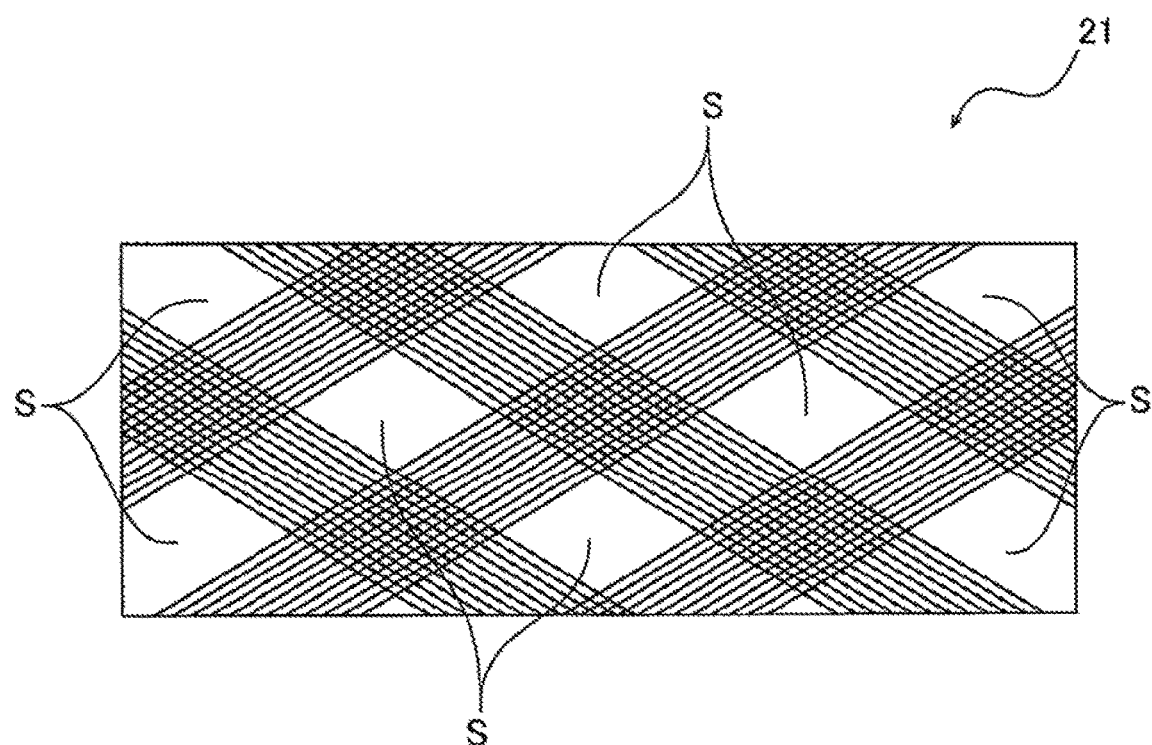
FIG. 4 is a partially enlarged view of a shield layer shown in FIG. 2B.

FIG. 4 is a partially enlarged view of the shield layer 21 shown in FIG. 2B. Further, as shown in the enlarged view of FIG. 4, the shield layer 21 is formed in a lattice shape with a gaps S at a predetermined interval therebetween. Although the shield layer 21 is formed of a metal wire or a plated fiber in a lattice shape in the example illustrated in FIG. 4, the shield layer 21 is not limited thereto, and may be formed of a metal foil in a lattice shape.

Since such a lattice-shaped shield layer 21 is used, the inner-side resin 22 and the outer-side resin 23 are connected to each other in the gaps S of the lattice in the resin tube 20. As a result, positional deviation between the shield layer 21 and the resins can be made less likely to occur. An area of the gap S is preferably 5 mm$^2$ or more. This is because when the area of the gap S is less than 5 mm$^2$, the connection between the inner-side resin 22 and the outer-side resin 23 becomes insufficient, and the effect of preventing positional deviation is reduced.

Further, in the present embodiment, a tensile strength of the resin constituting the resin tube 20 is made appropriate. That is, in the resin tube 20 according to the present embodiment, the tensile strength of the resin constituting the resin tube 20 is set so as to exceed a bending stress generated at a minimum bend radius with reference to the minimum bend radius among the plurality of bends B (the bend B may be one) shown in FIG. 1.

Figure 5:
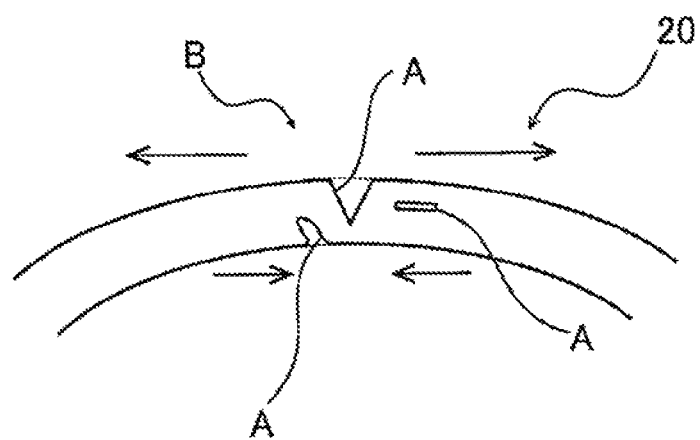
FIG. 5 is a conceptual diagram showing a state of bending of a resin tube.

FIG. 5 is a conceptual diagram showing a state of bending of the resin tube 20. As shown in FIG. 5, the resin tube 20 is bent at the bend B. and a crack is generated from an outer side of the bend B, or a defect is generated on an inner side due to necking. Such a portion becomes an air layer A. The air layer A has a thermal conductivity lower than that of each member (resin or the shield layer 21) forming the resin tube 20. For this reason, if the air layer A is formed at the bend B, a decrease in heat dissipation performance may be caused. However, in the present embodiment, since the tensile strength of the resin tube 20, i.e., the tensile strength of the inner side resin 22 and the outer-side resin 23, exceeds the bending stress generated when the shielded electric wire 1 is bent with the minimum bend radius in the routing structure, it is possible to reduce the possibility that the air layer A is formed due to generation of a crack or the like. Therefore, a decrease in heat dissipation performance is suppressed.

More specifically, a bending stress σ can be expressed by σ=E(y/r). Here, E is a longitudinal section coefficient (Young's modulus), y is a distance from a neutral axis, and r is a bend radius. E and y can be obtained based on the resin and a size used for the resin tube 20. Therefore, when the minimum bend radius is known, the bending stress is also known. In the shielded electric wire 1 according to the present embodiment, the material and the like of the resin tube 20 are to be set in advance in accordance with the minimum bend radius at the time of routing.

Next, a manufacturing method and an operation of a routing structure of the shielded electric wire 1 according to the present embodiment will be described. First, the tensile strength of the shielded electric wire 1 is to be set in accordance with a form of the shielded electric wire 1 when being routed (in particular, in accordance with a minimum bend radius of bends of the shielded electric wire 1). For example, a size (thickness) of the resin tube 20 is determined according to a size of the electric wire. Accordingly, a value of y in the bending stress σ=E(y/r) is determined. Next, a value of r is determined based on the minimum bend radius. The Young's modulus E is determined based on the material used for the resin tube 20, and the bending stress a is obtained. For the resin tube 20, a material having a tensile strength exceeding the bending stress a is selected, and the resin tube 20 is manufactured with the material.

In the resin tube 20 manufactured in this manner, cracks or the like are not generated in the bend B, and the air layer A is less likely to be formed. Therefore, heat dissipation performance is secured.

In addition, in the present embodiment, the shield layer 21 has a shield resistance of 103.8 mΩ/m or less and a shield density of 50% or more, and thus the shielding effect of 30 dB is secured in the entire range of 10 kHz or more and 1 GHz or less.

In particular, since the shield layer 21 is formed in a lattice shape, the inner-side resin 22 and the outer-side resin 23 are connected to each other in the gap S of the lattice, and formation of the air layer A due to deviation between the resin and the shield layer 21 is suppressed. Thus, the heat dissipation performance can be secured more easily.

In this way, according to the routing structure of the shielded electric wire 1 according to the present embodiment, since the tensile strength of the resin of the resin tube 20 exceeds the bending stress at the time of bending that is generated when the shielded electric wire 1 is bent with the minimum bend radius in the bend B in the routing structure, it is possible to prevent a situation from occurring where a crack or the like is generated due to the bending of the resin tube 20 at the bend B and the air layer A is formed, causing a decrease in the heat dissipation performance. In addition, since the shield layer 21 has a shield resistance of 103.8 mΩ/m or less and a shield density of 50% or more, the shielding performance of 30 dB can be secured in both a low frequency range and a high frequency range. Therefore, it is possible to suppress a decrease in heat dissipation performance and to secure the shielding performance.

The shield layer 21 is formed in a lattice shape having gaps S at a predetermined interval, and in the resin tube 20, the inner-side resin 22 and the outer-side resin 23 are connected to each other in the gaps S of the lattice of the shield layer 21. Therefore, with the connection at the gaps S of the lattice at the bend B, it is possible to reduce a possibility that a positional relationship between the shield layer 21 and the resin is changed and air enters a deviated portion, causing a decrease in the heat dissipation performance.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims.

For example, the materials and the like are not limited to those described above, and can be changed as appropriate. In addition, the shielded electric wire 1 according to the embodiment may not be formed in a lattice shape. For example, metal wires, metal foils, or the like of the shielded electric wire 1 may be arranged in a spiral shape or the like, or may be arranged along an axial direction of the shielded electric wire 1.

What is claimed is:

1. A routing structure of a shielded electric wire, wherein the shielded electric wire including an electric wire and a resin tube covering the electric wire is routed in a state of being bent, the resin tube including a shield layer, an inner-side resin and an outer-side resin, the shield layer being interposed between the inner-side resin and the outer-side resin, wherein the resin tube is configured such that, a tensile strength of the inner-side resin and the outer-side resin is greater than a bending stress to be generated when the shielded electric wire is bent with a minimum bend radius in the routing structure, and wherein the shield layer has a shield resistance equal to or smaller than 103.8 mΩ/m and a shield density equal to or greater than 50%, the shield density being a ratio of an area of a surface of the electric wire covered by the shield layer to an area of an entirety of the surface of the electric wire.

2. The routing structure according to claim 1, wherein the shield layer is formed in a lattice shape having gaps provided at a predetermined interval, and wherein the resin tube is configured such that, the inner-side resin and the outer-side resin are connected to each other in the gaps.

* * * * *